US012250972B2

(12) United States Patent
Jiang et al.

(10) Patent No.: US 12,250,972 B2
(45) Date of Patent: Mar. 18, 2025

(54) AEROSOL GENERATION DEVICE AND HEATING ASSEMBLY THEREOF

(71) Applicant: SHENZHEN SMOORE TECHNOLOGY LIMITED, Shenzhen (CN)

(72) Inventors: Zhenlong Jiang, Guangdong (CN); Pei Li, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 249 days.

(21) Appl. No.: 17/542,493

(22) Filed: Dec. 6, 2021

(65) Prior Publication Data

US 2022/0175045 A1 Jun. 9, 2022

(30) Foreign Application Priority Data

Dec. 7, 2020 (WO) ................ PCT/CN2020/134299
Mar. 26, 2021 (CN) ......................... 202110326890.5

(51) Int. Cl.
*A24F 40/51* (2020.01)
*A24F 40/46* (2020.01)
(Continued)

(52) U.S. Cl.
CPC .............. *A24F 40/51* (2020.01); *A24F 40/46* (2020.01); *A24F 40/57* (2020.01); *H05B 3/42* (2013.01)

(58) Field of Classification Search
CPC ........... A24F 40/51; A24F 40/46; A24F 40/57
See application file for complete search history.

(56) References Cited

U.S. PATENT DOCUMENTS 8,191,555 B2 * 6/2012 Herbrich .............. A61M 11/041 131/194
2015/0136124 A1 5/2015 Aronie
2020/0120993 A1 * 4/2020 Atkins ..................... H05B 3/03
(Continued)

FOREIGN PATENT DOCUMENTS

CN 105852222 A 8/2016
CN 106455695 A 2/2017
(Continued)

OTHER PUBLICATIONS

Mattox, D. M. (2010). Film characterization and some basic film properties. Handbook of Physical Vapor Deposition (PVD) Processing, 399-438. https://doi.org/10.1016/b978-0-8155-2037-5.00011-3 (Year: 2010).*

(Continued)

*Primary Examiner* — Philip Y Louie
*Assistant Examiner* — Nicole A Szumigalski
(74) *Attorney, Agent, or Firm* — Andrew C. Cheng

(57) ABSTRACT

The present disclosure relates to an aerosol generation device and a heating assembly thereof. The heating assembly includes an electrically conductive external tube, an electrical resistance circuit disposed in the external tube and having an electrode electrically connected with the external tube, a first electrode lead wire in electrical connection with the external tube, and a second electrode lead wire in electrical connection with an opposite electrode of the electrical resistance circuit. The external tube is electrically conductive, and electrode lead wires that are needed for the electrical resistance circuit and the temperature detection circuit are led out via the external tube. Such a structural configuration can help to reduce the number of electrode lead wires needed for the heating assembly and to increase the distance among each of the electrode lead wires.

19 Claims, 11 Drawing Sheets

(51) Int. Cl.
*A24F 40/57* (2020.01)
*H05B 3/42* (2006.01)

(56) References Cited

U.S. PATENT DOCUMENTS

| | | | | |
|---|---|---|---|---|
| 2021/0274600 A1* | 9/2021 | Liu | A24F 40/46 | |
| 2022/0007728 A1* | 1/2022 | Wu | A24F 40/40 | |
| 2022/0218031 A1* | 7/2022 | Wang | H05B 3/40 | |
| 2023/0130948 A1* | 4/2023 | Yan | H05B 1/0291 | 131/329 |

FOREIGN PATENT DOCUMENTS

| | | | | | |
|---|---|---|---|---|---|
| CN | 207220158 U | | 4/2018 | | |
| CN | 207803449 U | * | 9/2018 | A24F 47/008 | |
| CN | 108697174 A | | 10/2018 | | |
| CN | 109527657 A | | 3/2019 | | |
| CN | 209090060 U | | 7/2019 | | |
| CN | 209346090 U | | 9/2019 | | |
| CN | 110893013 A | | 3/2020 | | |
| CN | 210226910 U | * | 4/2020 | A24F 40/46 | |
| CN | 111616420 A | * | 9/2020 | A24F 40/46 | |
| CN | 112244366 A | | 1/2021 | | |
| CN | 112315030 A | | 2/2021 | | |
| CN | 215775567 U | | 2/2022 | | |
| CN | 217487667 U | | 9/2022 | | |
| JP | H06176857 A | | 6/1994 | | |
| JP | 3217131 U | | 7/2018 | | |
| JP | 2019503708 A | | 2/2019 | | |
| KR | 101375316 B1 | | 3/2014 | | |
| WO | WO-2019199010 A1 | * | 10/2019 | A24F 40/20 | |
| WO | WO-2019218122 A1 | * | 11/2019 | A24F 40/10 | |
| WO | 2020057046 A1 | | 3/2020 | | |
| WO | 2020228441 A1 | | 11/2020 | | |

OTHER PUBLICATIONS

Machine translation of “CN-210226910-U” obtained Nov. 8, 2023, from Espacenet.com (Year: 2023).*

Machine translation of “WO-2019199010-A1” obtained Nov. 8, 2023, from Espacenet.com (Year: 2023).*

Machine translation of “CN-207803449-U” obtained Nov. 8, 2023, from Espacenet.com (Year: 2023).*

The office action of JP application No. 2021-198763 issued on Apr. 4, 2023.

European search report of EP application No. 21212424.2 issued on Jul. 4, 2022.

Office Action of CN application No. 202120623555.7 issued on Apr. 7, 2022.

International Search Report of PCT Patent Application No. PCT/CN2020/134299 issued on Sep. 14, 2021.

International Written Opinion of PCT Patent Application No. PCT/CN2020/134299 issued on Sep. 14, 2021.

The Office Action of Chinese Patent Application No. 202022913702.2 issued on Sep. 13, 2021.

Communication pursuant to Article 94(3) EPC of EP application No. 21212424.2 issued on Nov. 8, 2023.

The first office action of JP application No. 2021-198763 issued on Apr. 4, 2023.

The second office action of JP application No. 2021-198763 issued on Aug. 29, 2023.

The office action of CN patent application No. 202110326890.5 issued on Oct. 31, 2024.

The search report of CN patent application No. 202110326890.5 issued on Oct. 31, 2024.

The written decision on Registration of KR patent application No. 10-2021-0173732 issued on Nov. 26, 2024.

* cited by examiner

AEROSOL GENERATION DEVICE AND HEATING ASSEMBLY THEREOF

FIELD OF THE DISCLOSURE

The present disclosure relates to the field of atomization, and more particularly to an aerosol generation device and a heating assembly thereof.

DESCRIPTION OF THE RELATED ART

A heat-not-burn atomization device is an aerosol generation device that generates inhalable mist by heating an atomizable material at a low temperature in a not-burning manner. An existing needle-like heating assembly often adopts a ceramic shell, with a heating coil arranged inside the ceramic shell. The ceramic shell is insulative and is not electrically conductive, so that two lead wires must be disposed in the interior thereof, resulting in complication of the structure of a support bar in the interior. Further, to measure the temperature of the heating assembly, two additional lead wires are necessary for temperature detection. The number of lead wires is large, and the distance between the lead wires is small.

SUMMARY OF THE DISCLOSURE

The technical problem that the present disclosure aims to resolve is to provide, in view of the above-described deficiency of the prior art, an improved heating assembly and an aerosol generation device including the heating assembly.

The technical solution that the present disclosure adopts to resolve the technical problem is to provide a heating assembly, which includes an electrically conductive external tube, an electrical resistance circuit disposed in the external tube and having an electrode electrically connected with the external tube, a first electrode lead wire in electrical connection with the external tube, and a second electrode lead wire in electrical connection with an opposite electrode of the electrical resistance circuit.

In some embodiments, the electrical resistance circuit and/or the external tube is made of a metallic PTC material.

In some embodiments, the electrical resistance circuit and/or the external tube has a temperature coefficient of resistance in the range of 1500-3500 ppm.

In some embodiments, the heating assembly further includes a temperature detection circuit disposed in the external tube;

the temperature detection circuit is made of a metallic PTC material, or alternatively, the temperature detection circuit includes a thermocouple structure.

In some embodiments, an end of the temperature detection circuit is in electrical connection with the first electrode lead wire or the second electrode lead wire; and the heating assembly further includes a third electrode lead wire in electrical connection with an opposite end of the temperature detection circuit.

In some embodiments, the heating assembly further includes a third electrode lead wire and a fourth electrode lead wire that are respectively in electrical connection with two ends of the temperature detection circuit.

In some embodiments, the electrical resistance circuit and/or the temperature detection circuit includes an electrical resistance wire.

In some embodiments, the first electrode lead wire is soldered to an outside of a bottom of the external tube.

In some embodiments, an outside surface of the external tube is provided with a protection layer.

In some embodiments, the protection layer includes at least one of a ceramic coating layer and a vitreous glaze layer.

In some embodiments, the heating assembly further includes a needle arranged at a top of the external tube.

In some embodiments, an upper end of the electrical resistance circuit is crimped between the needle and the external tube, so as to be in contact and conductive connection with the external tube.

In some embodiments, the needle includes a fit-in portion fit in the external tube and a conic lead-in portion connected to an upper end of the fit-in portion.

In some embodiments, the heating assembly further includes a support bar disposed in the external tube, and the electrical resistance circuit is disposed on the support bar.

In some embodiments, the electrical resistance circuit and/or the temperature detection circuit is helically wound around the support bar.

In some embodiments, a thermally conductive filler is filled between an internal surface of the external tube and an external surface of the support bar.

In some embodiments, the second electrode lead wire is connected to a lower end of the electrical resistance circuit and is led out in company with the support bar.

In some embodiments, the heating assembly further includes a base, and a lower end of the external tube is inserted into the base.

In some embodiments, the base is made of a ceramic material or a PEEK material.

The present disclosure further provides an aerosol generation device, which includes a heating assembly described in any one of the above.

Implementation of the present disclosure provides the following beneficial effects. The external tube is configured to be electrically conductive, such that the electrode lead wires that are needed for the electrical resistance circuit and the temperature detection circuit can be led out via the external tube. Such a structural configuration can help to reduce the number of electrode lead wires needed for the heating assembly and to increase the distance among each of the electrode lead wires.

BRIEF DESCRIPTION OF THE DRAWINGS

A detailed description of the present disclosure will be provided below with reference to the attached drawings and embodiments, and in the drawings.

DETAILED DESCRIPTION OF PREFERRED EMBODIMENTS OF THE DISCLOSURE

For better understanding of the technical features, purposes, and efficacy of the present disclosure, embodiments of the present disclosure will be described in detail with reference to the drawings.

Figure 1:
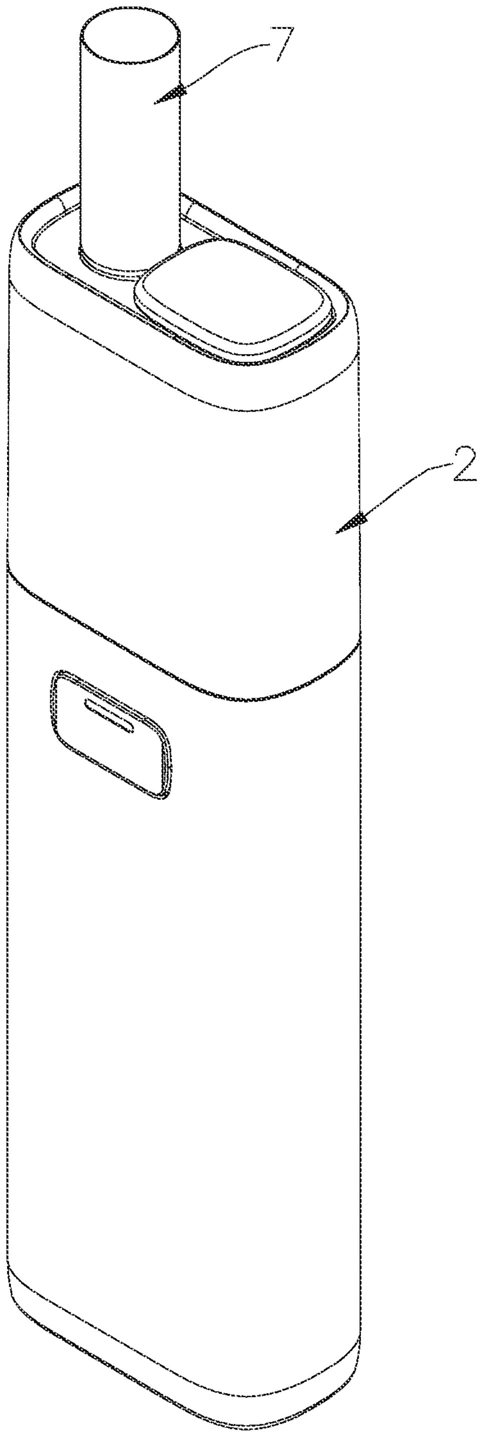
FIG. 1 is a schematic structural perspective view illustrating an aerosol generation device according to an embodiment in an operation condition.
Figure 2:
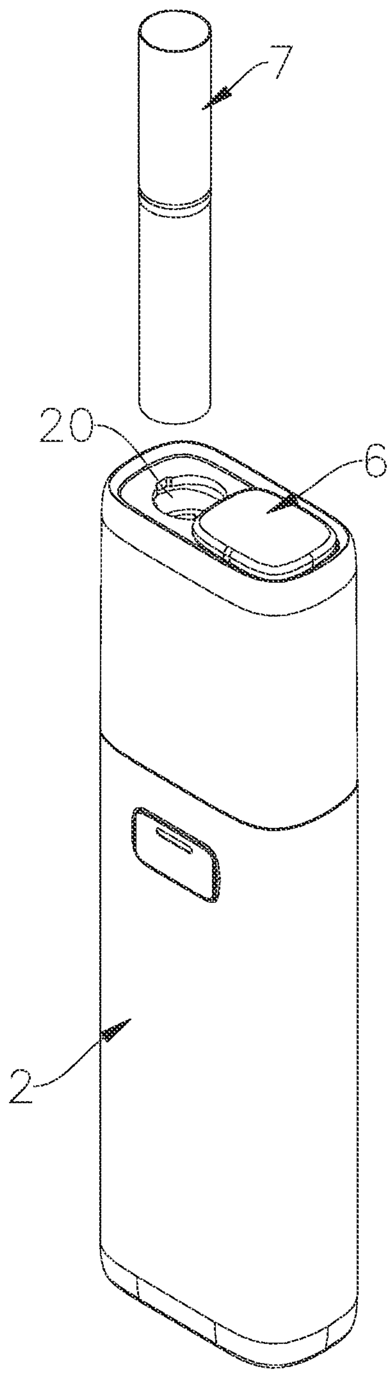
FIG. 2 is a schematic structural perspective view illustrating the aerosol generation device shown in FIG. 1 in a condition of being separated from an aerosol-generating base material.
Figure 3:
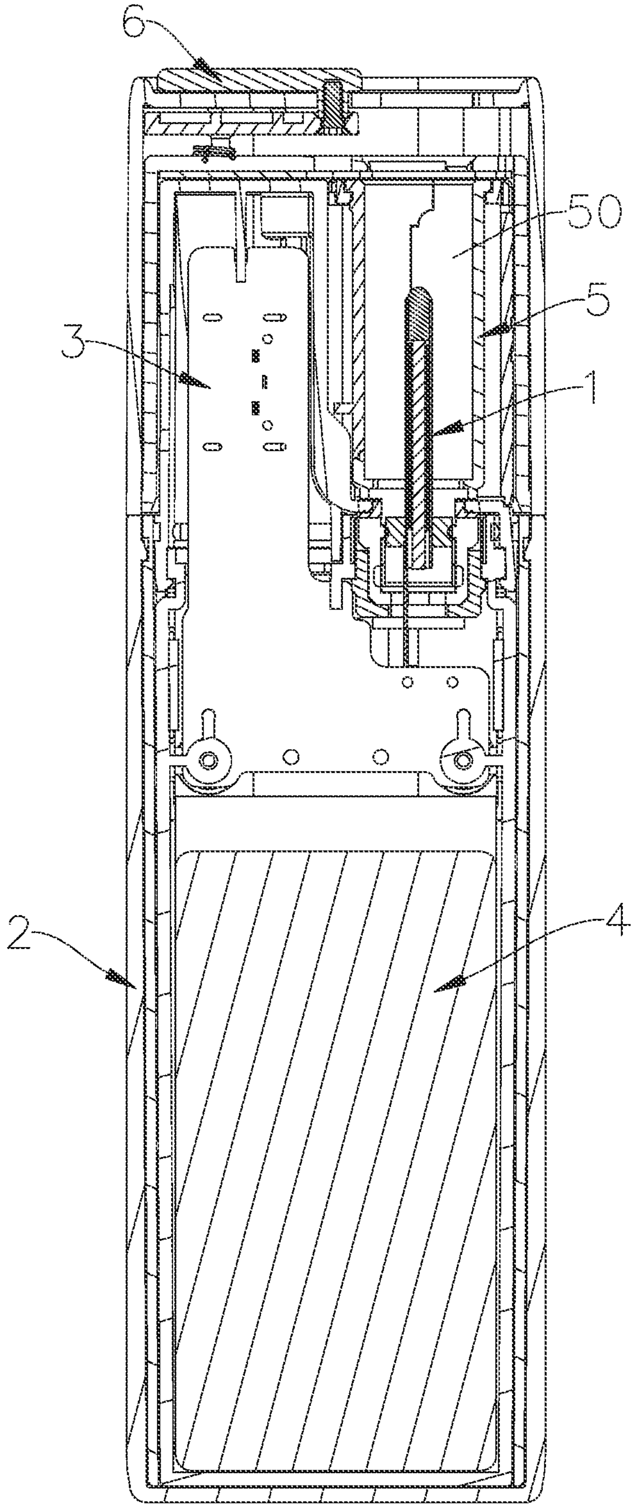
FIG. 3 is a schematic structural cross-sectional view illustrating the aerosol generation device shown in FIG. 2.

FIGS. 1-3 show an aerosol generation device according to some embodiments of the present disclosure. The aerosol generation device is operable for baking and heating an aerosol-generating substrate 7 inserted therein at a low temperature, in order to release an aerosol extract from the aerosol-generating substrate 7 in a not-burning condition. As shown in the drawings, the aerosol generation device is generally in a shape of a rectangular column, and the aerosol-generating substrate 7 can be a cylindrical cigarette. A top of the aerosol generation device is provided with an insertion opening 20 that matches with the aerosol-generating substrate 7 in respect of shape and size. The top of the aerosol generation device is further provided with a dust-proof lid 6 for closing or opening the insertion opening 20. When the aerosol generation device is not in operation, the dust-proof lid 6 can be pushed to close the insertion opening 20, in order to prevent dust from entering the insertion opening 20. In an attempt to use, the dust-proof lid 6 can be pulled to open the insertion opening 20, in order to allow the aerosol-generating substrate 7 to be inserted through the insertion opening 20. It is appreciated that the aerosol generation device is not limited to a rectangular column and can be made in other shape, such as a cylindrical column or an elliptical column.

The aerosol generation device may include a shell 2, and a heating assembly 1, an extracting tube 5, a main board 3, and a battery 4 disposed inside the shell 2. The extracting tube 5 has an internal surface defining a receiving space 50 in which the aerosol-generating substrate 7 is receivable, and the aerosol-generating substrate 7 is insertable through the insertion opening 20 into the receiving space 50. An upper end of the heating assembly 1 is extended into the receiving space 50 and can be inserted into the aerosol-generating substrate 7 to get a tight contact engagement with the aerosol-generating substrate 7. The heating assembly 1, when energized to generate heat, transmits heat to the aerosol-generating substrate 7 so as to realize baking and heating of the aerosol-generating substrate 7. The battery 4 is in electrical connection with the heating assembly 1, and connection and disconnection between the two is controllable by means of a switch. The main board 3 is configured for laying a corresponding control circuit thereon.

Figure 4:
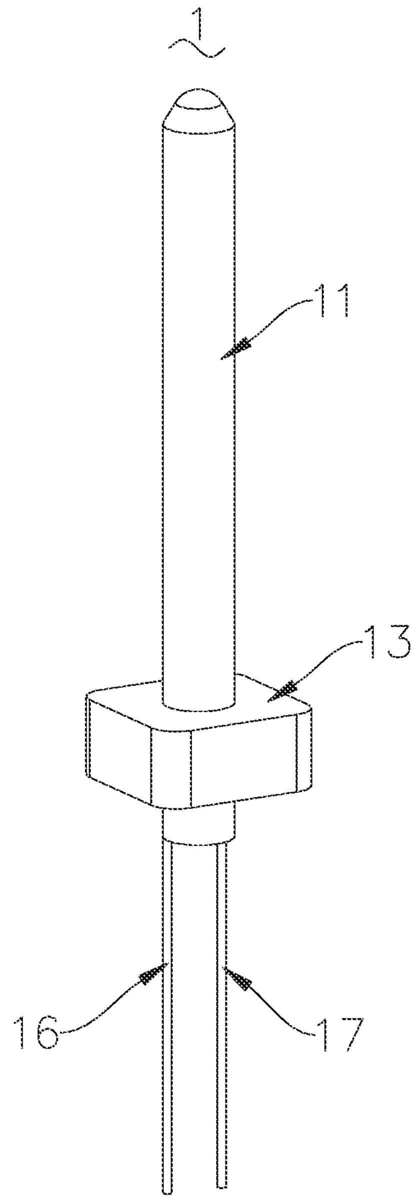
FIG. 4 is a schematic structural perspective view illustrating a heating assembly shown in FIG. 3.
Figure 5:
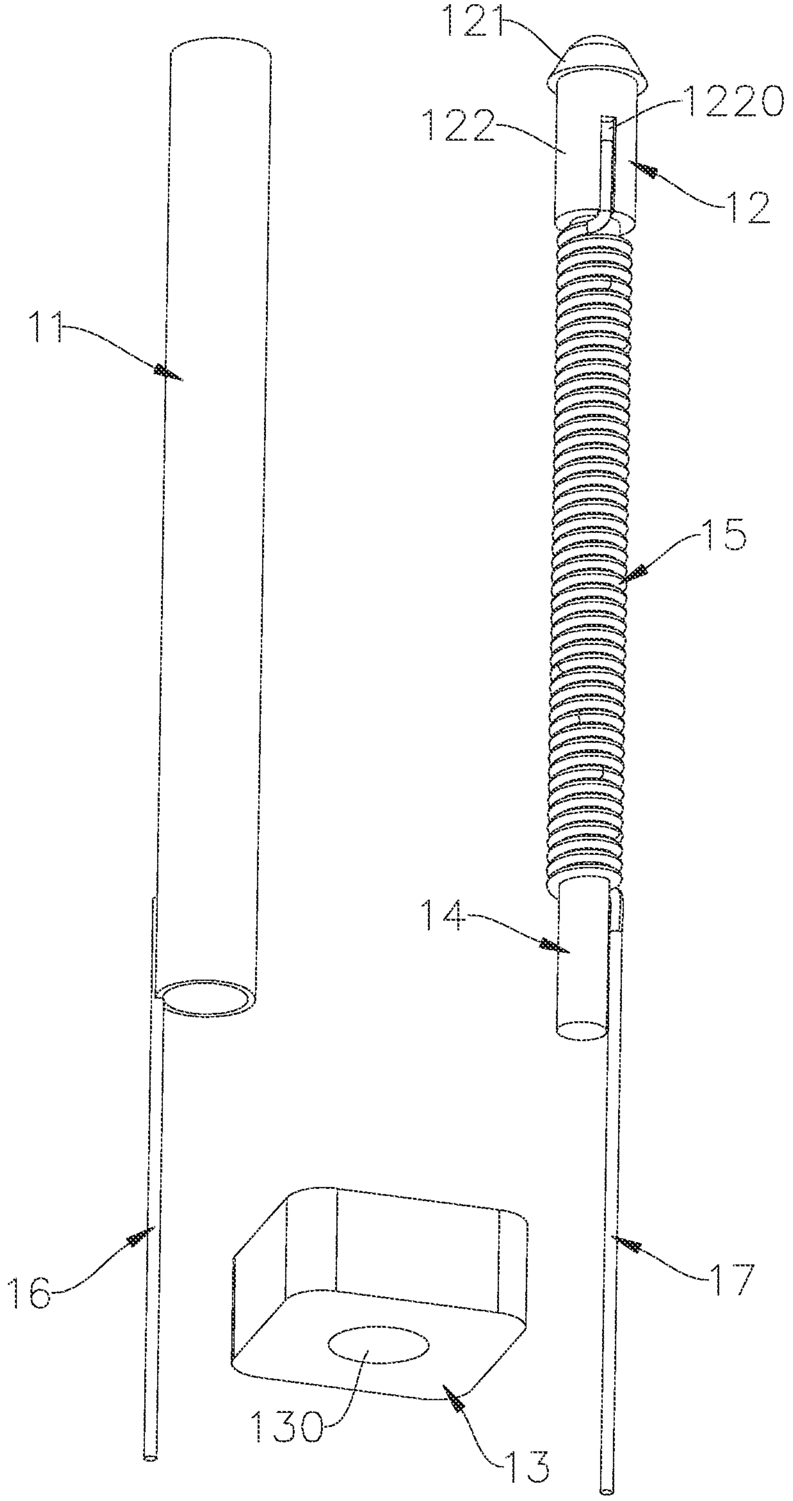
FIG. 5 is a schematic structural exploded view illustrating the heating assembly shown in FIG. 4.
Figure 6:
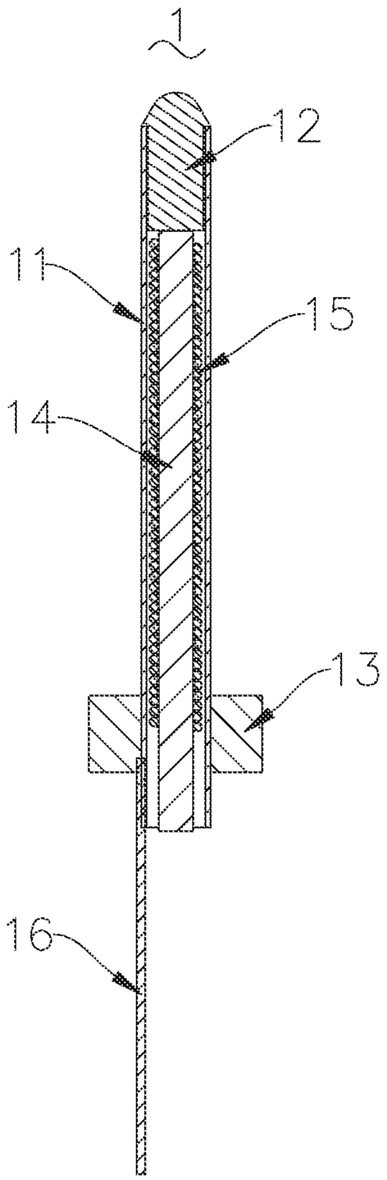
FIG. 6 is a schematic structural cross-sectional view illustrating the heating assembly shown in FIG. 4.

As shown in FIGS. 4-6, the heating assembly 1 may include a base 13 that is configured for being fixed in the shell 2, an external tube 11 that extends longitudinally through the base 13 and is electrically conductive, a needle 12 that is embedded in a top of the external tube 11, a support bar 14 that is arranged longitudinally in the external tube 11, an electrical resistance circuit 15 that is arranged in the external tube 11 and has an electrode in electrical connection with the external tube 11, a first electrode lead wire 16 that is in electrical connection with the external tube 11, and a second electrode lead wire 17 that is in electrical connection with an opposite electrode of the electrical resistance circuit 15.

The base 13 can be made of a material of ceramics or polyether ether ketone (PEEK). The base 13 in some embodiments may be in the shape of a rectangular cuboid, and the base 13 is provided, in a center thereof, with a through hole 130 for extension of the external tube 11 therethrough. In other embodiments, the base 13 may have a cross-sectional contour in other shape, such as a circle, an ellipse, or a rectangle.

The support bar 14 in some embodiments may be made of a temperature-resistant insulative material, such as being made of a temperature-resistant insulative ceramic material. The support bar 14 can be in a shape of a solid cylindrical bar or a hollow cylindrical tube, and an outside surface of the support bar 14 may be provided with a helical groove for receiving the electrical resistance circuit 15 to wind therein. In other embodiments, the support bar 14 may have a cross-sectional contour in other shape, such as an ellipse, a square, or a rectangle.

The electrical resistance circuit 15 is helically wound around outside of the support bar 14 at a helical pitch in an axial direction, and an insulative layer may be provided on an external surface of the electrical resistance circuit 15 by means of soaking or spraying. The electrical resistance circuit 15 has a heat generation function and a temperature detection function, and may be made of a metallic PTC (positive temperature coefficient) material. The PTC material has an electrical resistance that gets increasingly higher with an increase of the temperature, so as to realize synchronized heat generation and temperature detection, achieving an effect of "being a heat generation element and also a temperature detection element". Based on the needs of users, the temperature coefficient of resistance of the electrical resistance circuit 15 may be selected within the range of 1500-3500 ppm. Further, in addition to embodying the electrical resistance circuit 15 through winding an electrical resistant wire, embodiment may be achieved by using a screen-printed circuit or surface film coating. Such a structure realizes a solution of integrated temperature control with two lead wires, simplifying an overall structure of the heating assembly and reducing the cost. In other embodiments, the electrical resistance circuit 15 may be configured only for generating heat, and in this condition, the electrical resistance circuit 15 may be made of a metallic material that has relatively high electrical resistivity and generates a relatively large amount of heat.

In some ways of embodiment, the electrical resistance circuit 15 may be arranged as a structure having a variable helical pitch in order to suit the needs for a temperature field. For example, the helical pitch for an upper portion of the electrical resistance circuit 15 is made smaller in order to suit the needs for a higher temperature in the upper portion, while the helical pitch for a lower portion is relatively large in order to suit the needs for a lower temperature in the lower portion. Further, for example, the helical pitch of the electrical resistance circuit 15 is increased from an upper end toward a lower end.

The external tube 11 may be made of a temperature-resistant alloy or an electrically conductive metallic material, for example a low-resistance high-conductivity material, such as stainless steel. The external tube 11 can be in a shape of a circular tube and is sleeved on the support bar 14 and the electrical resistance circuit 15, and a lower end of the external tube 11 can be fit into the base 13 and welded to the base 13. Due to the external surface insulation of the electrical resistance circuit 15, the electrical resistance circuit 15 can be arranged as being in contact engagement with, or forming a gap with respect to, an inside surface of the external tube 11. To enhance the effect of insulation, the inside surface of the external tube 11 may be subjected to insulation treatment, such as being covered with an insulation coating. An outside surface of the external tube 11 is coated with a protection layer, such as a ceramic coating layer or a vitreous glaze layer. The protection layer functions to isolate the external tube 11 from the surrounding atmosphere and also functions to make an outside surface of the heating assembly smooth, facilitating reduction of deposition of soot thereon and making cleaning easy. A filler, such as a temperature-resistant resin or glass cement having high thermal conductivity, may be filled between an internal wall of the external tube 11 and an external wall of the support bar 14, and this helps secure the electrical resistance circuit 15 in position and also fills up a gap between the two to facilitate transmission of heat. In other embodiments, the external tube 11 may have a cross-sectional contour in other shape, such as an ellipse, a square, or a rectangle.

In other embodiments, the external tube 11 may be made of a metallic PTC material, namely the external tube 11 and the electrical resistance circuit 15 may commonly realize the effect of "being a heat generation element and also a temperature detection element". It is appreciated that, in some other embodiments, the effect of "being a heat generation element and also a temperature detection element" for the heating assembly can also be realized by having only the external tube 11 individually made of metallic PTC.

The needle 12 may be made of a temperature-resistant insulative or conductive material, such as stainless steel or ceramics. The needle 12 in some embodiments may include a lead-in portion 121 in an upper portion and a fit-in portion 122 in a lower portion. The lead-in portion 121 is of a conic form to facilitate penetration into the aerosol-generating substrate 7. A head part of the lead-in portion 121 can be of a circular arc form. A diameter of a large end of the lead-in portion 121 is identical to an external diameter of the external tube 11 and is greater than an external diameter of the fit-in portion 122. The fit-in portion 122 is of a cylindrical form and is tightly fit to inside of the external tube 11, and a stepped surface that is formed between the lead-in portion 121 and the fit-in portion 122 abuts an upper end face of the external tube 11. An upper end of the electrical resistance circuit 15 is crimped between the fit-in portion 122 and the external tube 11, so that contact and conductive connection with respect to the external tube 11 is achieved through interference fitting to thereby electrically conducting with the first electrode lead wire 16. An external surface of the fit-in portion 122 is also provided with a wire slot 1220 that receives the upper end of the electrical resistance circuit 15 to locate therein. The first electrode lead wire 16 may be led out from an outer surface of a bottom portion of the external tube 11. The second electrode lead wire 17 is connected to a lower end of the electrical resistance circuit 15 and is led out in company with the support bar 14.

To manufacture the heating assembly 1, the electrical resistance circuit 15 is first wound around the support bar 14, and soaking or spraying is applied to form the insulative layer. Afterwards, the upper end of the electrical resistance circuit 15 is crimped between the needle 12 and the external tube 11, so that the upper end of the electrical resistance circuit 15 is in contact and electrically conductive connection with the external tube 11. The first electrode lead wire 16 is soldered to the outside surface of the bottom portion of the external tube 11, and the second electrode lead wire 17 is soldered to the lower end of the electrical resistance circuit 15 to be led out in company with the support bar 14.

The first electrode lead wire 16 and the second electrode lead wire 17 can both be electrically connected to the control circuit of the aerosol generation device at the same time, and the control circuit may realize heating control and temperature detection of the electrical resistance circuit 15 through the first electrode lead wire 16 and the second electrode lead wire 17. The control circuit may directly or indirectly acquire the operating resistance R of the electrical resistance circuit 15 of the heating assembly 1 in an operating state, and correspondingly determines the temperature T of the electrical resistance circuit 15 with such an operating resistance R according to the property of the metallic PTC material. It is appreciated that during the process of acquiring the temperature T, the electrical resistance circuit 15 may conduct heating at the same time, or may alternatively not conduct heating. In the solution where temperature detection and heating are not conducted at the same time, the heating period is $t_1$ and the temperature detection period is $t_2$, and a complete heating and temperature detection period is $t_1+t_2$. It is appreciated that to ensure the efficiency and persistence of heating, the temperature detection period $t_2$ is generally made far less than the heating period $t_1$. In the solution where temperature detection and heating are conducted at the same time, the control circuit may acquire the operating voltage U and the operating current I of the electrical resistance circuit 15 in the operating state, and calculation is made to indirectly determine the operating resistance R, so as to accordingly determine the temperature T of the electrical resistance circuit 15 at the moment. During this process, there is no need to shut down the heating process of the electrical resistance circuit 15. It is appreciated that the above process is equally applicable to the embodiments in which the external tube 11 is made of a metallic PTC material, with a difference being that adaptive adjustment may be made in respect of a corresponding relationship between the operating resistance R and the temperature T. In fact, for the entirety of the heating assembly, the external tube 11 and/or the electrical resistance circuit 15, at least one thereof, being made of the PCT metal material suffices to achieve the effect of "being a heat generation element and also a temperature detection element", and in the specific embodiment, adjustment is only needed for the corresponding relationship between the operating resistance R and the temperature T.

Figure 7:
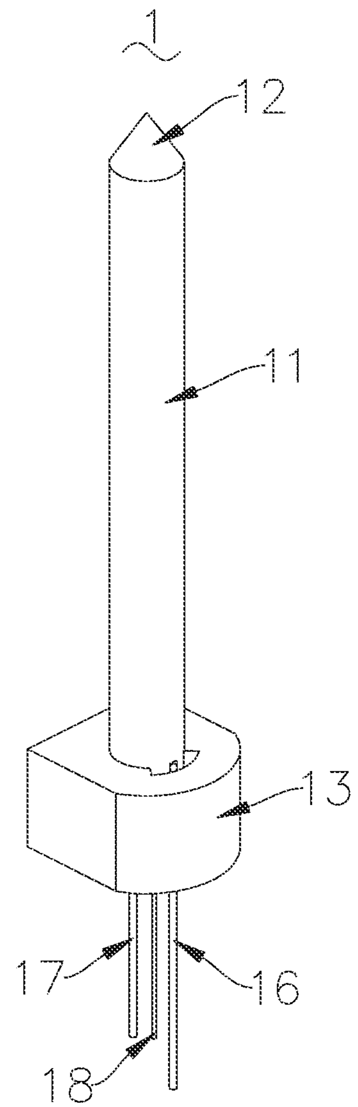
FIG. 7 is a schematic structural perspective view illustrating a first alternative solution of the heating assembly shown in FIG. 4.
Figure 8:
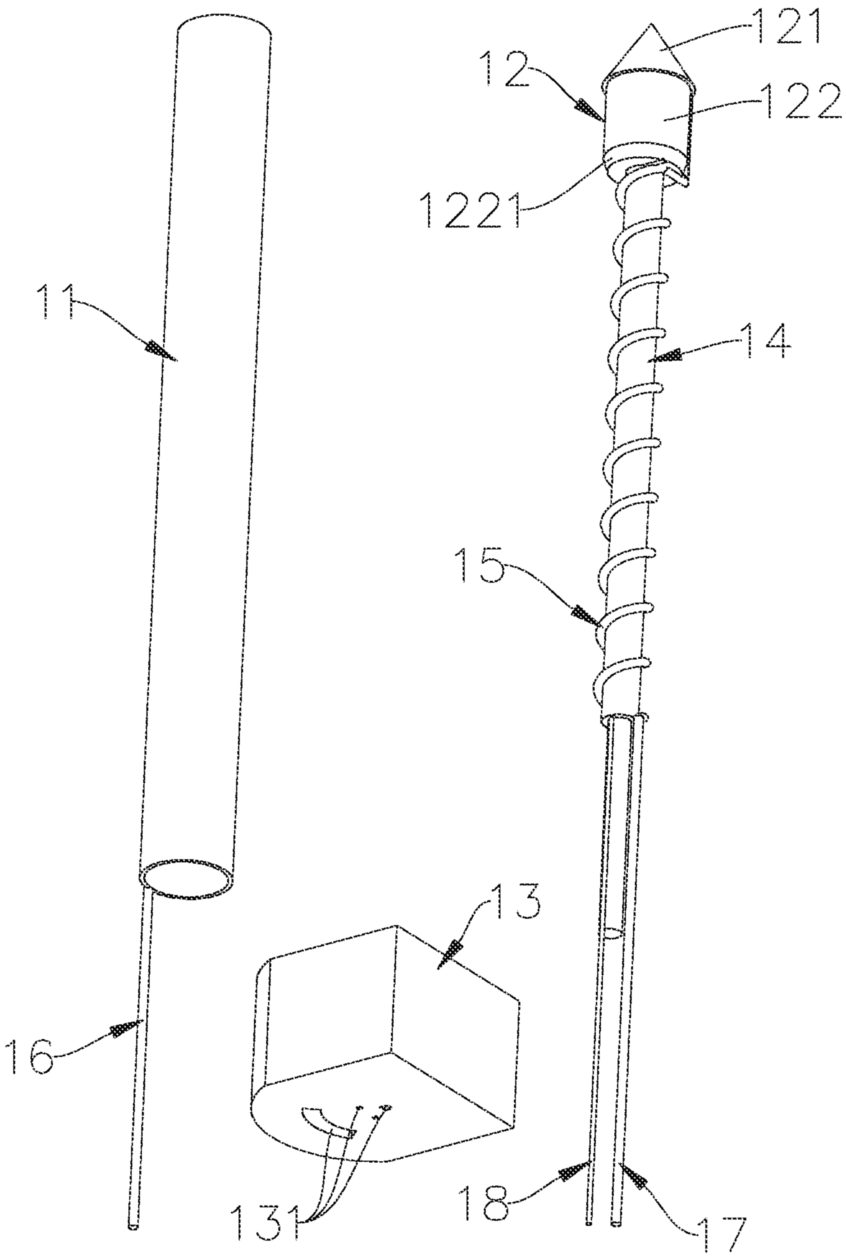
FIG. 8 is a schematic structural exploded view illustrating the heating assembly shown in FIG. 7.
Figure 9:
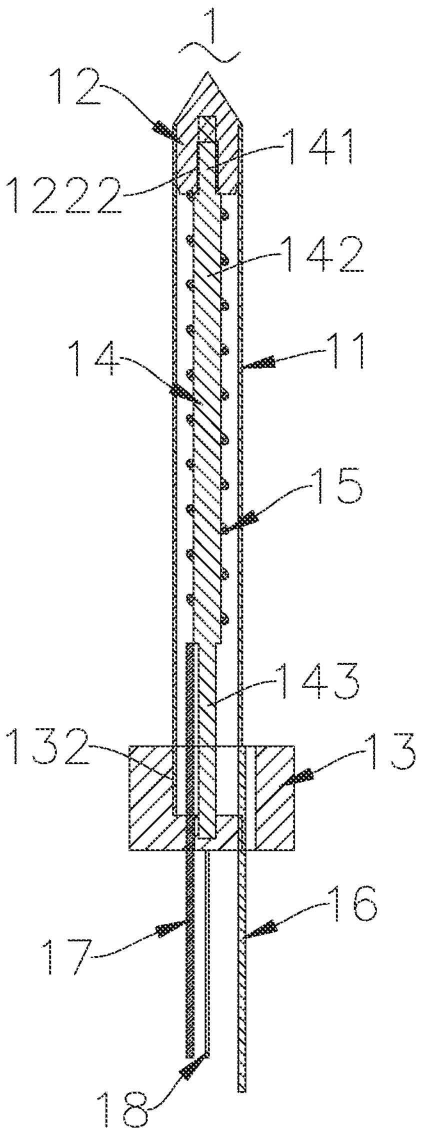
FIG. 9 is a schematic structural cross-sectional view illustrating the heating assembly shown in FIG. 7.

FIGS. 7-9 show the heating assembly 1 provided in a first alternative solution of the present disclosure, which includes an external tube 11 that is electrically conductive, a needle 12 that is mounted in a top of the external tube 11, a support bar 14 that is arranged longitudinally in the external tube 11, an electrical resistance circuit 15 and a temperature detection circuit that are arranged in the external tube 11 and have an electrode in electrical connection with the external tube 11, a first electrode lead wire 16 that is in electrical connection with the external tube 11, a second electrode lead wire 17 that is in electrical connection with an opposite electrode of the electrical resistance circuit 15, a third electrode lead wire 18 that is in electrical connection with an opposite electrode of the temperature detection circuit, and a base 13 arranged at a bottom of the external tube 11. One electrode of the electrical resistance circuit 15 and the temperature detection circuit is both in conductive connection with the external tube 11, so as to be in conductive connection with the first electrode lead wire 16, and the electrical resistance circuit 15 and the temperature detection circuit share one common electrode so as to reduce the number of electrode lead wires for the heating assembly 1. Further, the first electrode lead wire 16 being led out from the external tube 11 can increase the distance among each of the electrode lead wires. It is appreciated that, in other embodiments, it is alternatively feasible that lower ends of the electrical resistance circuit 15 and the temperature detection circuit share one common electrode lead wire, such as sharing the second electrode lead wire 17, while two electrode lead wires soldered to the external tube 11 are respectively in electrical connection with upper ends of the electrical resistance circuit 15 and the temperature detection circuit.

The support bar 14 may be made of a temperature-resistant insulative material, such as being made of a temperature-resistant insulative ceramic material and is generally of an elongate cylindrical form including a first section 141, a second section 142, and a third section 143 that are sequentially connected from top to bottom. A diameter of the second section 142 is greater than a diameter of the first section 141 and a diameter of the third section 143, and is less than an inside diameter of the external tube 11. The first section 141 is tightly fit in and fixed in the needle 12, and a stepped surface formed between the first section 141 and the second section 142 may abut a bottom surface of the needle 12, while the third section 143 is tightly fit in and fixed in the base 13.

The electrical resistance circuit 15 and the temperature detection circuit are helically wound around outside of the second section 142 in an axial direction. The electrical resistance circuit 15 functions for heating the aerosol-generating substrate 7 when being energized to generate heat and may be made of a metallic PTC material or may be made of a metallic material that has relatively high electrical resistivity and generates a relatively large amount of heat. The temperature detection circuit may be made of a metallic PTC material, or may alternatively include a thermocouple structure. Based on the needs of users, the temperature coefficient of resistances of the electrical resistance circuit 15 and the temperature detection circuit may be selected within the range of 1500-3500 ppm.

The electrical resistance circuit 15 and the temperature detection circuit may adopt a layered structure, and specifically, the temperature detection circuit is arranged in an inner layer, while the electrical resistance circuit 15 is located in an outer layer. To manufacture, the temperature detection circuit is first wound around and fixed on the support bar 14, and soaking or spraying is applied to form an insulative layer; and after sintering and curing, winding of the electrical resistance circuit 15 is then conducted; and finally, fixing is performed by means of the needle 12 at the top and the base 13 at the bottom. The second electrode lead wire 17 that is soldered to and in conductive connection with the lower end of the electrical resistance circuit 15 and the third electrode lead wire 18 that is soldered to and in conductive connection with the lower end of the temperature detection circuit are led out in company with the support bar 14. Further, in addition to embodying the electrical resistance circuit 15 and the temperature detection circuit through winding electrical resistant wires, embodiment may be achieved by using a screen-printed circuit or surface film coating. In other embodiments, the electrical resistance circuit 15 and the temperature detection circuit may be arranged in the same layer on the support bar 14, such as the electrical resistance circuit 15 and the temperature detection circuit being wound, in a side by side manner, around the support bar 14.

The needle 12 may be made of a temperature-resistant alloy or metallic material, such as stainless steel. The needle 12 in some embodiments may include a lead-in portion 121 in an upper portion and a fit-in portion 122 in a lower portion. The lead-in portion 121 is of a tip-sharpened conic form to facilitate penetration into the aerosol-generating substrate 7. A diameter of a large end of the lead-in portion 121 is identical to an external diameter of the external tube 11 and is greater than an external diameter of the fit-in portion 122. The fit-in portion 122 is of a cylindrical form and is tightly fit to inside of the external tube 11, and a stepped surface that is formed between the lead-in portion 121 and the fit-in portion 122 abuts an upper end face of the external tube 11. A bottom surface of the fit-in portion 122 is formed, through recessing, with an insertion trough 1222, and the first section 141 at the upper end of the support bar 14 is tightly fit into the insertion trough 1222. An outside of a lower end of the fit-in portion 122 is provided with a guide surface 1221 to facilitate introduction into the external tube 11. The guide surface 1221 can be an oblique surface or an arc surface, so that the lower end of the fit-in portion 122 is generally in a form of a circular stage. The upper ends of the electrical resistance circuit 15 and the temperature detection circuit are crimped between the lead-in portion 121 of the needle 12 and the external tube 11 so as to be in conductive connection with the external tube 11, and thus in conductive connection with the first electrode lead wire 16. The first electrode lead wire 16 is soldered to an outside surface of a bottom portion of the external tube 11, so as to be in conductive connection with the external tube 11.

The external tube 11 is in a shape of a circular tube and may be made of a temperature-resistant alloy or an electrically conductive metallic material, such as stainless steel. The external tube 11 is filled with a temperature-resistant insulative medium in an interior thereof, while a ceramic coating layer is coated on the outside. The base 13 may be a ceramic structure, which is welded to the external tube 11 by means of a ceramic coating material. A top surface of the base 13 is recessed to form a mounting trough 132, and the external tube 11 is fit into the mounting trough 132, and a bottom surface of the external tube 11 abuts a trough bottom of the mounting trough 132. A bottom surface of the base 13 is recessed to form electrode apertures 131 that are in communication with the mounting trough 132, and there are at least three such electrode apertures 131 to respective receive the first electrode lead wire 16, the second electrode lead wire 17, the third electrode lead wire 18 to extend therethrough.

Figure 10:
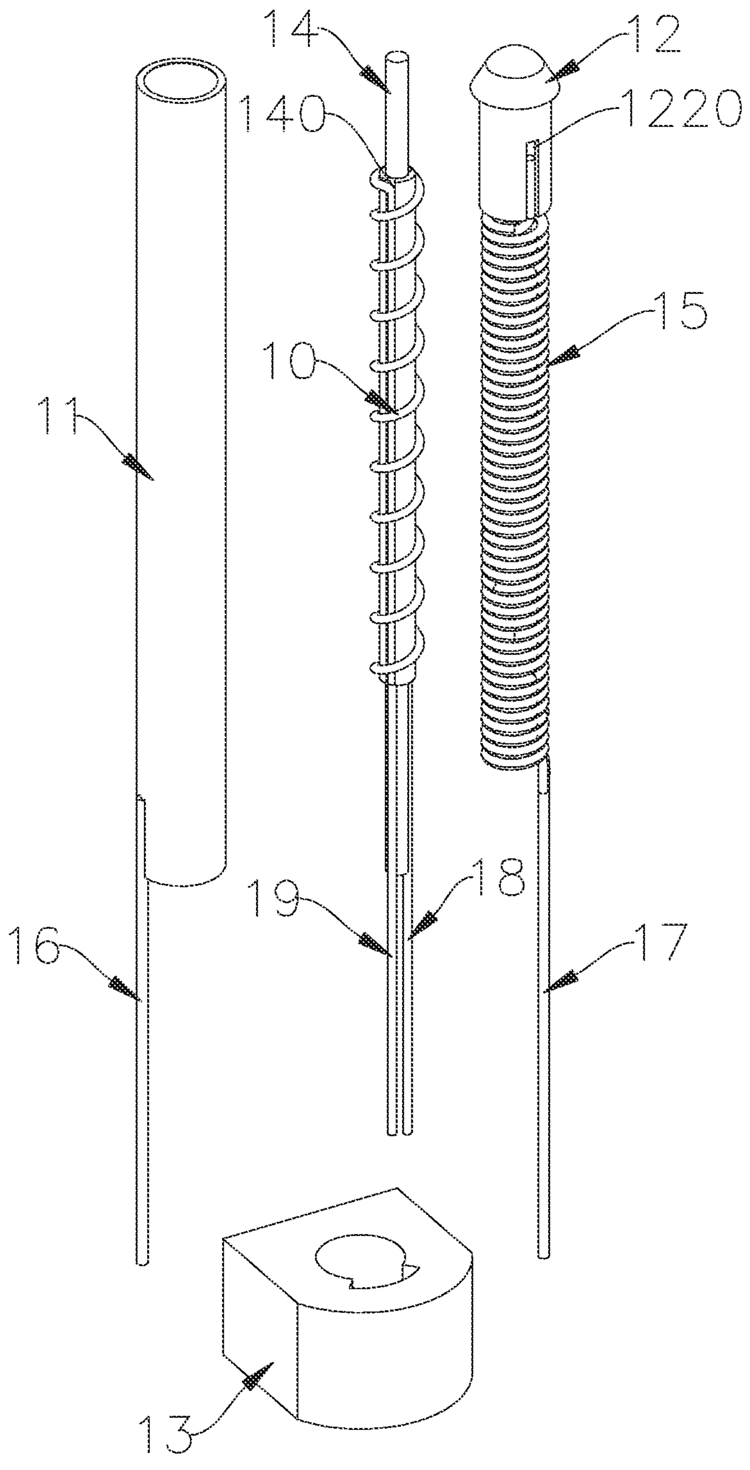
FIG. 10 is a schematic structural perspective view illustrating a second alternative solution of the heating assembly shown in FIG. 4.

FIG. 10 shows the heating assembly 1 provided in a second alternative solution of the present disclosure, of which a primary difference from the first alternative solution is that in the instant embodiment, the heating assembly 1 further includes a fourth electrode lead wire 19, and the third electrode lead wire 18 and the fourth electrode lead wire 19 respectively function as two electrodes of the temperature detection circuit 10 for electrical connection with two ends of the temperature detection circuit 10. In the instant embodiment, the heating assembly 1 adopts a four-wire solution, and the electrical resistance circuit 15 and the temperature detection circuit 10 are independent of each other.

Specifically, an outside surface of the support bar 14 is provided with a wire slot 140 for laying of the fourth electrode lead wire 19, and the fourth electrode lead wire 19, after being soldered to an upper end of the temperature detection circuit 10, is led out in company with the wire slot 140, and the third electrode lead wire 18, after soldered to a lower end of the temperature detection circuit 10, is led out in company with the support bar 14. The upper end of the electrical resistance circuit 15 is electrically connected, through the external tube 11, with the first electrode lead wire 16, and the lower end of the electrical resistance circuit 15 is electrically connected with the second electrode lead wire 17. The upper end of the temperature detection circuit 10 is connected, through the external tube 11, with the fourth electrode lead wire 19, and the lower end of the temperature detection circuit is electrically connected with the third electrode lead wire 18.

Figure 11:
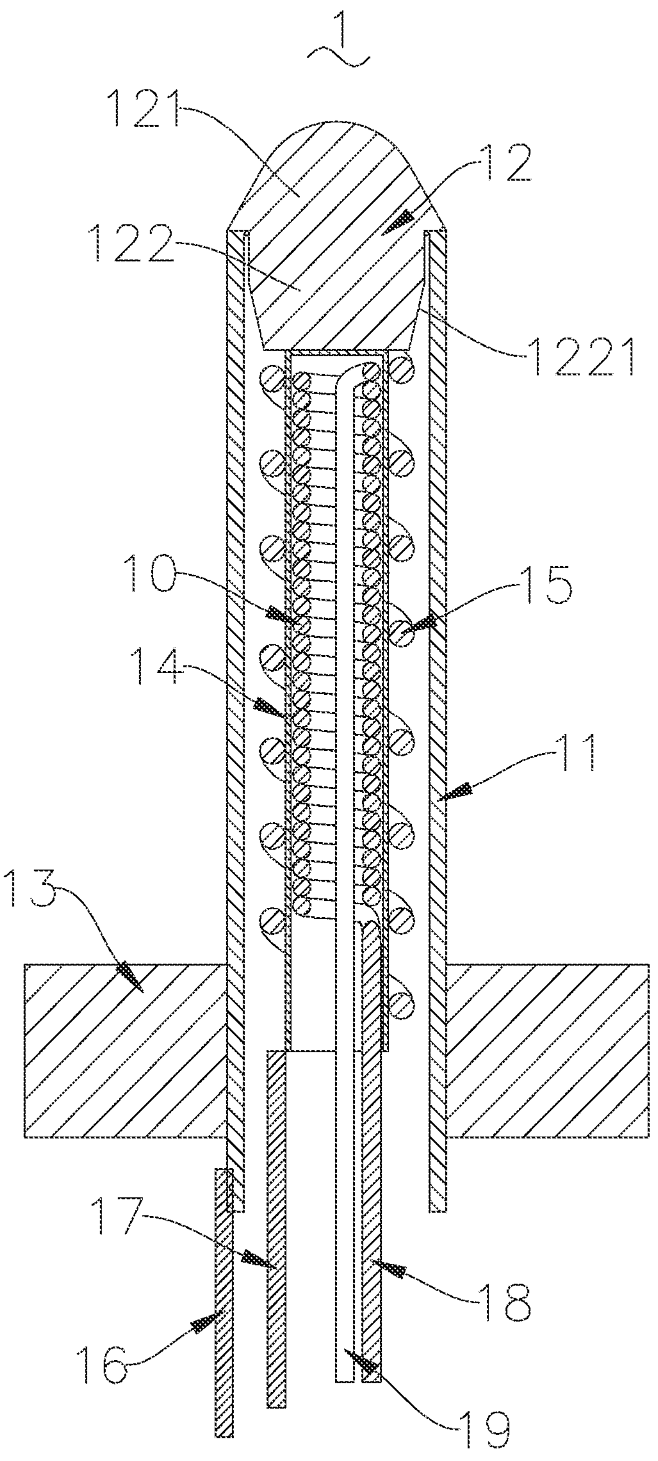
FIG. 11 is a schematic structural perspective view illustrating a third alternative solution of the heating assembly shown in FIG. 4.

FIG. 11 shows the heating assembly 1 provided in a third alternative solution of the present disclosure, of which a primary difference from the second alternative solution is that in the instant embodiment, the support bar 14 is in a form of a hollow cylinder, and the temperature detection circuit 10 is helically arranged on an internal surface of the support bar 14, while the electrical resistance circuit 15 is helically arranged on an external surface of the support bar 14.

It is appreciated that each of the technical features described above can be combined in any desired way, without subjecting to any constraints.

The above embodiments illustrate only the preferred embodiments of the present disclosure, of which the description is made in a specific and detailed way, but should not be thus construed as being limiting to the scope of the claims of present disclosure. Those having ordinary skill of the art may freely make combinations of the above-described technical features and make contemplate certain variations and improvements, without departing from the idea of the present disclosure, and all these are considered within the coverage scope of the claims of the present disclosure.

What is claimed is:

1. A heating assembly, characterized by comprising an electrically conductive external tube (11), an electrical resistance circuit (15) disposed in the external tube (11) and having an electrode electrically connected with a top end of the external tube (11), a first electrode lead wire (16) in electrical connection with the external tube (11), and a second electrode lead wire (17) in electrical connection with an opposite electrode of the electrical resistance circuit (15), wherein the heating assembly further comprises a solid support bar (14) disposed in the external tube (11), and the electrical resistance circuit (15) is disposed around an upper portion of the solid support bar (14);

the second electrode lead wire (17) is connected to a lower end of the electrical resistance circuit (15) and is led out a lower end of the external tube (11) in company with a lower portion of the solid support bar (14), the second electrode lead wire (17) being located between an outer surface of the lower portion of the solid support bar (14) and an inner surface of the external tube (11);

the heating assembly further comprises a needle (12) arranged at the top end of the external tube (11);

the support bar (14) comprises a first section (141), a second section (142), and a third section 143 that are sequentially connected from top to bottom;

a diameter of the second section (142) is greater than a diameter of the first section (141) and a diameter of the third section (143);

a shoulder is formed between the first section (141) and the second section (142) and abuts a bottom surface of the needle (12);

the electrical resistance circuit (15) is wound around the second section (142); and the first section (141) extends beyond the electrical resistance circuit (15) upwardly and is inserted into the needle (12), and the third section (143) extend beyond the electrical resistance circuit (15) downwardly.

2. The heating assembly according to claim 1, wherein the electrical resistance circuit (15) and/or the external tube (11) is made of a metallic PTC material.

3. The heating assembly according to claim 1, wherein the heating assembly further comprises a temperature detection circuit disposed in the external tube (11);

the temperature detection circuit is made of a metallic PTC material, or the temperature detection circuit comprises a thermocouple structure.

4. The heating assembly according to claim 3, wherein an end of the temperature detection circuit is in electrical connection with the first electrode lead wire (16) or the second electrode lead wire (17); and the heating assembly further comprises a third electrode lead wire (18) in electrical connection with an opposite end of the temperature detection circuit.

5. The heating assembly according to claim 3, wherein the heating assembly further comprises a third electrode lead wire (18) and a fourth electrode lead wire (19) that are respectively in electrical connection with two ends of the temperature detection circuit.

6. The heating assembly according to claim 1, wherein the first electrode lead wire (16) is soldered to an outside of a bottom of the external tube (11).

7. The heating assembly according to claim 1, wherein an outside surface of the external tube (11) is provided with a protection layer.

8. The heating assembly according to claim 7, wherein the protection layer comprises at least one of a ceramic coating layer and a vitreous glaze layer.

9. The heating assembly according to claim 1, wherein an upper end of the electrical resistance circuit (15) is crimped between the needle (12) and the external tube (11), so as to be in contact and conductive connection with the external tube (11).

10. The heating assembly according to claim 1, wherein the electrical resistance circuit (15) and/or the temperature detection circuit is helically wound around the support bar (14).

11. The heating assembly according to claim 1, wherein a thermally conductive filler is filled between an internal surface of the external tube (11) and an external surface of the support bar (14).

12. An aerosol generation device, comprising a heating assembly, wherein the heating assembly comprises an electrically conductive external tube (11), an electrical resistance circuit (15) disposed in the electrically conductive external tube (11) and having an electrode electrically connected with the electrically conductive external tube (11), a first electrode lead wire (16) in electrical connection with the electrically conductive external tube (11), and a second electrode lead wire (17) in electrical connection with an opposite electrode of the electrical resistance circuit (15), the electrical resistance circuit (15) being disposed on an upper portion of a support bar (14) which is disposed in the electrically conductive external tube (11);

wherein the heating assembly further comprises a temperature detection circuit disposed in the electrically conductive external tube (11), the temperature detection circuit having an electrode in electrical connection with the external tube (11);

wherein the heating assembly further includes a base (13) sleeved on the electrically conductive external tube (11), the base defines a through hole, the electrically conductive external tube (11) extends through or into the through hole, a lower portion of the support bar (14) is tightly fit in and fixed in the base (13), the base further defines at least two spaced electrode apertures to respectively allow the first electrode lead wire (16), the second electrode lead wire (17) to extend therethrough, and the electrical resistance circuit (15) and the first electrode lead wire (16) are arranged at opposite sides of the base (13) in a longitudinal direction of the electrically conductive external tube (11); and wherein the heating assembly further comprises a needle (12) arranged at a top of the external tube (11);

the support bar (14) comprises a first section (141), a second section (142), and a third section 143 that are sequentially connected from top to bottom;

the third section (143) is tightly fit in and fixed in the base (13);

a diameter of the second section (142) is greater than a diameter of the first section (141) and a diameter of the third section (143):

a shoulder is formed between the first section (141) and the second section (142) and abuts a bottom surface of the needle (12); and the electrical resistance circuit (15) is wound around the second section (142), the first section (141) extends beyond the electrical resistance circuit (15) upwardly and is inserted into the needle (12), and the third section (143) extend beyond the electrical resistance circuit (15) downwardly.

13. The aerosol generation device according to claim 12, wherein the electrical resistance circuit (15) and/or the external tube (11) is made of a metallic PTC material.

14. The aerosol generation device according to claim 12, wherein the temperature detection circuit is made of a metallic PTC material, or the temperature detection circuit comprises a thermocouple structure.

15. The aerosol generation device according to claim 14, wherein the heating assembly further comprises a third electrode lead wire (18) in electrical connection with an opposite end of the temperature detection circuit.

16. The aerosol generation device according to claim 14, wherein the heating assembly further comprises a third electrode lead wire (18) and a fourth electrode lead wire (19) that are respectively in electrical connection with two ends of the temperature detection circuit.

17. The aerosol generation device according to claim 12, wherein an upper end of the electrical resistance circuit (15) is crimped between the needle (12) and the external tube (11), so as to be in contact and conductive connection with the external tube (11).

18. The aerosol generation device according to claim 12, wherein the needle (12) comprises a lead-in portion (121) in an upper portion and a fit-in portion (122) in a lower portion; and the fit-in portion (122) is tightly fit to inside of the external tube (11).

19. The aerosol generation device according to claim 12, wherein a top surface of the base (13) is recessed to form a mounting trough (132), the external tube (11) is fit into the mounting trough (13), and the at least two electrode apertures are in communication with the mounting trough (132).

* * * * *